US012804484B2

(12) United States Patent
Henriksson et al.

(10) Patent No.: US 12,804,484 B2
(45) Date of Patent: Nov. 17, 2026

(54) STEERING DATA TRAFFIC TO LTE-5G DUAL CONNECTIVITY UTILIZING Xn INTERFACE

(71) Applicant: Telefonaktiebolaget LM Ericsson (publ), Stockholm (SE)

(72) Inventors: Daniel Henriksson, Linkoping (SE); Linnea Faxen, Linkoping (SE); Stefan Johansson, Linkoping (SE); Magnus Degerfalk, Sturefors (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 287 days.

(21) Appl. No.: 18/572,579

(22) PCT Filed: Jun. 21, 2021

(86) PCT No.: PCT/SE2021/050613

§ 371 (c)(1),
(2) Date: Dec. 20, 2023

(87) PCT Pub. No.: WO2022/271055

PCT Pub. Date: Dec. 29, 2022

(65) Prior Publication Data

US 2024/0292287 A1 Aug. 29, 2024

(51) Int. Cl.
*H04W 36/00* (2009.01)
*H04W 76/15* (2018.01)

(52) U.S. Cl.
CPC ................ *H04W 36/00692* (2023.05); *H04W 36/0083* (2013.01); *H04W 36/008357* (2023.05); *H04W 76/15* (2018.02)

(58) Field of Classification Search
CPC ....... H04W 36/00692; H04W 36/0083; H04W 36/008357; H04W 76/15; H04W 36/22;
(Continued)

(56) References Cited

U.S. PATENT DOCUMENTS

2014/0241317 A1* 8/2014 Jamadagni ............ H04L 5/0032 370/329
2015/0181473 A1 6/2015 Horn et al.
(Continued)

FOREIGN PATENT DOCUMENTS

CN 112055387 A 12/2020
EP 2346282 A1 7/2011
(Continued)

OTHER PUBLICATIONS

3GPP TS 38.401, Technical Specification Group Radio Access Network NG-RAN Architecture Description, Release 16.5.0, Apr. 2021, pp. 1-79, Valbonne, France.
(Continued)

*Primary Examiner* — Thai Nguyen
(74) *Attorney, Agent, or Firm* — FBT Gibbons LLP

(57) ABSTRACT

A method performed by a first network node for steering data traffic in a communication with a User Equipment, UE, in a wireless communications network is provided. The first network node sends (601) a request to a second network node. The request requests to set up an interface between the first network node hosting a first cell and a second network node hosting a second cell. The second cell is a neighbor to the first cell. The first network node receives (602) a message from the second network node over the requested set up interface. The message comprises indications indicating that: A third cell provided by a third network node is a neighbor to the second cell, the second cell is supporting multi carrier connectivity towards the third cell, and the third cell is supporting multi carrier connectivity towards the second cell. The first network node determines (603) whether or not to handover the UE from the first cell to the second cell for multi carrier connectivity towards the third cell, based on the indications in the received message. The first network node then steers (604) the data traffic in the
(Continued)

communication 15 with the UE according to the determining of whether or not to handover the UE to the second network node.

11 Claims, 12 Drawing Sheets

(58) Field of Classification Search
CPC ..... H04W 88/06; H04W 92/20; H04W 36/24; H04W 36/14; H04W 76/16; H04W 76/20
See application file for complete search history.

(56) References Cited

U.S. PATENT DOCUMENTS

| | | | | |
|---|---|---|---|---|
| 2019/0037417 | A1* | 1/2019 | Lei | H04W 36/00698 |
| 2020/0322855 | A1 | 10/2020 | Dong et al. | |
| 2021/0044993 | A1 | 2/2021 | Jha et al. | |

FOREIGN PATENT DOCUMENTS

| | | | |
|---|---|---|---|
| WO | WO 2020/167199 | A1 | 8/2020 |
| WO | WO 2021/044375 | A1 | 3/2021 |

OTHER PUBLICATIONS

3GPP TS 38.423, Technical Specification Group Radio Access Network NG-RAN Xn application protocol (XnAP), Release 16.5.0, Apr. 2021, pp. 1-461, Valbonne, France—(divided into 14 submissions).
Huawei, “EN-DC X2 Setup Procedural Text”, 3GPP TSG-RAN3 Meeting #99, R3-180981, XP051401288, 3 pages, Feb. 26-Mar. 2, 2018, Athens, Greece.
European Search Report of EP Application No. 21947292.5, dated Jul. 12, 2024, 5 pages.
Ericsson—“Support for carrier aggregation”, 3GPP TSG-RAN WG3 #63-bis, R3-090920, Mar. 23-26, 2009, 2 pages, Seoul, Korea.

* cited by examiner

STEERING DATA TRAFFIC TO LTE-5G DUAL CONNECTIVITY UTILIZING Xn INTERFACE

CROSS REFERENCE TO RELATED DATA

This application is a national-phase entry under 35 USC § 371 of International Application No. PCT/SE2021/050613, filed Jun. 21, 2021, titled "STEERING DATA TRAFFIC IN COMMUNICATION WITH USER EQUIPMENT IN A WIRELESS COMMUNICATIONS NETWORK," the contents of which are hereby incorporated herein in its entirety.

TECHNICAL FIELD

Embodiments herein relate to a network node and a method therein. In some aspects, they relate to steering data traffic in a communication with a User Equipment (UE) in a wireless communications network.

BACKGROUND

In a typical wireless communication network, wireless devices, also known as wireless communication devices, mobile stations, stations (STA) and/or User Equipments (UE)s, communicate via a Wide Area Network or a Local Area Network such as a Wi-Fi network or a cellular network comprising a Radio Access Network (RAN) part and a Core Network (CN) part. The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in Fifth Generation (5G) telecommunications. A service area or cell area is a geographical area where radio coverage is provided by the radio network node. The radio network node communicates over an air interface operating on radio frequencies with the wireless device within range of the radio network node.

3GPP is the standardization body for specify the standards for the cellular system evolution, e.g., including 3G, 4G, 5G and the future evolutions. Specifications for the Evolved Packet System (EPS), also called a Fourth Generation (4G) network, have been completed within the 3rd Generation Partnership Project (3GPP). As a continued network evolution, the new releases of 3GPP specifies a 5G network also referred to as 5G New Radio (NR).

Frequency bands for 5G NR are being separated into two different frequency ranges, Frequency Range 1 (FR1) and Frequency Range 2 (FR2). FR1 comprises sub-6 GHz frequency bands. Some of these bands are bands traditionally used by legacy standards but have been extended to cover potential new spectrum offerings from 410 MHz to 7125 MHz. FR2 comprises frequency bands from 24.25 GHz to 52.6 GHz. Bands in this millimeter wave range have shorter range but higher available bandwidth than bands in the FR1.

Multi-antenna techniques may significantly increase the data rates and reliability of a wireless communication system. For a wireless connection between a single user, such as UE, and a base station, the performance is in particular improved if both the transmitter and the receiver are equipped with multiple antennas, which results in a Multiple-Input Multiple-Output (MIMO) communication channel. This may be referred to as Single-User (SU)-MIMO. In the scenario where MIMO techniques is used for the wireless connection between multiple users and the base station, MIMO enables the users to communicate with the base station simultaneously using the same time-frequency resources by spatially separating the users, which increases further the cell capacity. This may be referred to as Multi-User (MU)-MIMO. Note that MU-MIMO may benefit when each UE only has one antenna. Such systems and/or related techniques are commonly referred to as MIMO.

The current 5G RAN, also referred to as NG-RAN, architecture is depicted and described in 3GPP TS 38.401v15.5.0 (see http://www.3gpp.org/ftp//Specs/archive/38_series/38.401/38401-f50.zip) in FIG. 1. FIG. 1 depicts an overall NG RAN architecture. The NG architecture may be further described as follows:

The NG-RAN comprises of a set of gNBs connected to the Fifth Genetation Core network (5GC) through the NG.

A gNB may support Frequency Division Duplex (FDD) mode, Time Division Duplex (TDD) mode, or dual mode operation.

gNBs may be interconnected through an Xn interface.

A gNB may comprise a gNB-Central Unit (CU) and gNB-Distributed Unit (DU)s. A gNB-CU and a gNB-DU is connected via an F1 logical interface.

One gNB-DU is connected to only one gNB-CU.

It should be noted that for resiliency, a gNB-DU may be connected to multiple gNB-CU by appropriate implementation.

NG, Xn and F1 are logical interfaces. The NG-RAN is layered into a Radio Network Layer (RNL) and a Transport Network Layer (TNL). The NG-RAN architecture, i.e., the NG-RAN logical nodes and interfaces between them, is defined as part of the Radio Network Layer (RNL). For each NG-RAN interface, NG, Xn, F1, the related TNL protocol and the functionality are specified. The TNL provides services for user plane transport, signalling transport. If security protection for control plane and user plane data on TNL of NG-RAN interfaces has to be supported, Network Domain Security (NDS)/Internet Protocol (IP) (NDS/IP) 3GPP TS 33.401 shall be applied.

A gNB may also be connected to an LTE eNB via an EN-DC X2 interface. Another architectural option is that where an LTE eNB connected to the Evolved Packet Core network is connected over the NR Dual Connectivity (EN-DC) X2 interface with a so called en-gNB. The latter is a gNB not connected directly to a CN and connected via EN-DC X2 to an eNB for the sole purpose of performing dual connectivity (DC). This is shown in FIG. 2 depicting an overall Evolved Universal Terrestrial Access Network (E-UTRAN) architecture for EN-DC.

The architecture in FIG. 1 may be expanded by spitting the gNB-CU into two entities. See FIG. 3. So, in the split architecture option, the RAN protocol stack functionality is separated in different parts. The CU-Control Plane (CP) is expected to handle the RRC layer, the CU-User Plane (UP) will handle the Packet Data Convergence Protocol (PDCP) layer and the DU will handle the Radio Link Control (RLC), Medium Access Control (MAC) and Physical (PHY) layer of the protocol stack. In some further split the DU may have separated unit that handles the PHY parts separately compared to RLC and MAC layers that are handled in a DU.

As different units handle different protocol stack functionalities, there will be a need for inter-node communication between the DU, the CU-UP and the CU-CP. This is achieved via a F1-C interface related to control plane signalling, via F1-U interface related to user plane signalling for communication between CU and DU and via E1 for communication between CU-UP and CU-CP.

The E1 interface is a logical interface. It supports the exchange of signalling information between the endpoints. From a logical standpoint, the E1 is a point-to-point interface between a gNB-CU-CP and a gNB-CU-UP. The E1 interface enables exchange of UE associated information and non-UE associated information. The E1 interface is a control interface and is not used for user data forwarding.

All the interfaces F1-C, X2 and Xn are used to communicate information about for example served cells to a neighbour node, X2 and Xn, or to a central node CU-CP, F1-C.

The interface Xn is for example used by one node for informing neighbour nodes about served cells and configuration, but also comprises information about neighbours of the served cells. This may be done both via an Xn setup and/or response procedure and in NG-RAN node in a configuration update procedure.

In Xn the setup request and/or response one node sends a message to the cells served by the node. The message is sent from one NG-RAN node to another NG-RAN node. This message is e.g. sent by a NG-RAN node to a neighbouring NG-RAN node to transfer application data for an Xn-C interface instance. There may be three ways to transform information about served cells, Setup request, setup response and configuration transfer. The two first are exchanged when the Xn interface is established and the configuration transfer is sent when one node experience a change in its configuration and needs to report this to all neighbour nodes. The Neighbour Information NR IE from 3GPP TS 38.423, ver. 16.4, is shown below.

The Neighbour Information NR IE may be used for reporting basic parameters for the neighbour cells, such as PCI and CGI. There is also frequency info that may be reported.

The IE Connectivity Support is shown below, and it is used for informing if a neighbour cell supports EN-DC or not.

The Connectivity Support IE is used to indicate the connectivity supported by a NR cell

| IE/Group Name | Presence | Range | IE type and reference | Semantics description |
|---|---|---|---|---|
| EN-DC Support | M | | ENUMERATED (Supported, Not supported, . . . ) | |

A problem with the above prior art is reduced DL throughput, which will be explained below.

SUMMARY

As part of developing embodiments herein the inventors have identified a problem which first will be discussed.

Deployed radio networks may have a complicated topology. For example one cell (C) may have two neighbour cells (A, B) on different frequencies, but a network node serving the cell (C) may not be able to configure a UE with these neighbour cells as Secondary Cells (SCell)s due to limited hardware (HW) or Software (SW). However, these two neighbour cells (A, B) may have the necessary HW or SW

| IE/Group Name | Presence | Range | IE type and reference | Semantics description |
|---|---|---|---|---|
| Neighbour Information NR | | 1 . . . <maxnoofNeighbours> | | |
| >NRPCI | M | | INTEGER (0 . . . 1007) | NR Physical Cell ID |
| >NR CGI | M | | 9.2.2.7 | |
| >TAC | M | | 9.2.2.5 | Tracking Area Code |
| >RANAC | O | | RAN Area Code 9.2.2.6 | |
| >CHOICE NR-Mode-Info | M | | | |
| >>FDD | | | | |
| >>>FDD Info | | 1 | | |
| >>>>UL NR FreqInfo | M | | NR Frequency Info 9.2.2.19 | |
| >>>>DL NR FreqInfo | M | | NR Frequency Info 9.2.2.19 | |
| >>TDD | | | | |
| >>>TDD Info | | 1 | | |
| >>>>NR FreqInfo | M | | NR ARFCN Frequency Info 9.2.2.19 | |
| >Connectivity Support | M | | 9.2.2.28 | |
| >Measurement Timing Configuration | M | | OCTET STRING | Contains the MeasurementTimingConfiguration inter-node message for the neighbour cell, as defined in TS 38.331. |

required to do Carrier Aggregation (CA) between them. With the existing prior art solutions, there is no way for the network to consider the possibility of aggregation between A and B for a UE with its Primary Cell (PCell) currently located in cell C. The main problem with this is reduced DL throughput since the opportunity to perform a HO to cell A and configuring B as an SCell cannot be considered.

An object of embodiments herein is to improve the performance of a wireless communications network using multi carrier connectivity.

According to an aspect of embodiments herein, the object is achieved by a method performed by a first network node for steering data traffic in a communication with a User Equipment, UE, in a wireless communications network. The first network node sends a request to a second network node. The request requests to set up interface between the first network node hosting a first cell and a second network node hosting a second cell. The second cell is a neighbor to the first cell. The first network node receives a message from the second network node over the requested set up interface. The message comprises indications indicating that: A third cell provided by a third network node is a neighbor to the second cell, the second cell is supporting multi carrier connectivity towards the third cell, and the third cell is supporting multi carrier connectivity towards the second cell. The first network node determines whether or not to handover the UE from the first cell to the second cell for multi carrier connectivity towards the third cell, based on the indications in the received message. The first network node then steers the data traffic in the communication with the UE according to the determining of whether or not to handover the UE to the second network node.

According to another aspect of embodiments herein, the object is achieved by a method performed by a first network node configured to steer data traffic in a communication with a User Equipment, UE, in a wireless communications network. The first network node further being configured to:

- Send a request to a second network node, which request is adapted to request to set up an interface between the first network node hosting a first cell and a second network node hosting a second cell.
- receive a message from the second network node over the requested set up interface, which message is adapted to comprise indications indicating that: A third cell provided by a third network node is a neighbor to the second cell, the second cell is supporting multi carrier connectivity towards the third cell, and the third cell is supporting multi carrier connectivity towards the second cell,
- determine whether or not to handover the UE from the first cell to the second cell for multi carrier connectivity towards the third cell based on the indications in the received message, and
- steer the data traffic in the communication with the UE according to the determining of whether or not to handover the UE to the second network node.

Thanks to the indication indicating multi carrier connectivity of neighbor cells, the network node can perform traffic steering accordingly, and thereby make more beneficial traffic steering decisions for each UE in connected to the network. This in turn results in an improved performance of a wireless communications network using multi carrier connectivity.

BRIEF DESCRIPTION OF THE DRAWINGS

Examples of embodiments herein are described in more detail with reference to attached drawings in which:

FIGS. 11-14 are flowcharts illustrating methods implemented in a communication system including a host computer, a base station and a user equipment.

DETAILED DESCRIPTION

Example embodiments herein relate to enhanced traffic steering with additional indicated connectivity support.

According to example embodiments herein, more types of connectivity capability for a served cell is indicated when information message is sent to a neighbor node. The neighbor node is then capable to incorporate indicated capability of multi carrier connectivity in traffic steering decisions and thereby make more beneficial decisions for each UE that it serves.

In some embodiments, the Connectivity Support IE is expanded to also include an indication about which served cells that are capable to perform multi carrier connectivity towards its neighbor cells.

In some other embodiments, the Connectivity Support IE may comprise indications about which cells that are capable of performing NR Dual Connectivity (DC) such as EN-DC and NR-DC towards neighbor cells.

Thus, examples of embodiments herein provide an expanded connectivity status IE to allow for better traffic steering with multi carrier connectivity such as e.g. carrier aggregation and NR-DC capability between neighbor cells and their neighbors to current serving network node e.g., gNB.

With the indications about which of the neighbor cells that also are capable of performing multi carrier connectivity, for example CA, towards their neighbors a network node such as e.g. an NG-RAN Node may utilize the indicated capability of multi carrier connectivity in traffic steering decisions. For example, it is possible to realize that a UE may get better performance after being handed over to the neighbor cell and thereby improve the Downlink (DL) and/or Uplink (UL) throughput for single UE:s, and on a network level.

If also capability of multi carrier connectivity, such as a NR-DC connectivity, is included over Xn, traffic steering may take that information into account when taking decision about the most suitable Primary Cell (PCell) for a UE.

Figure 1:
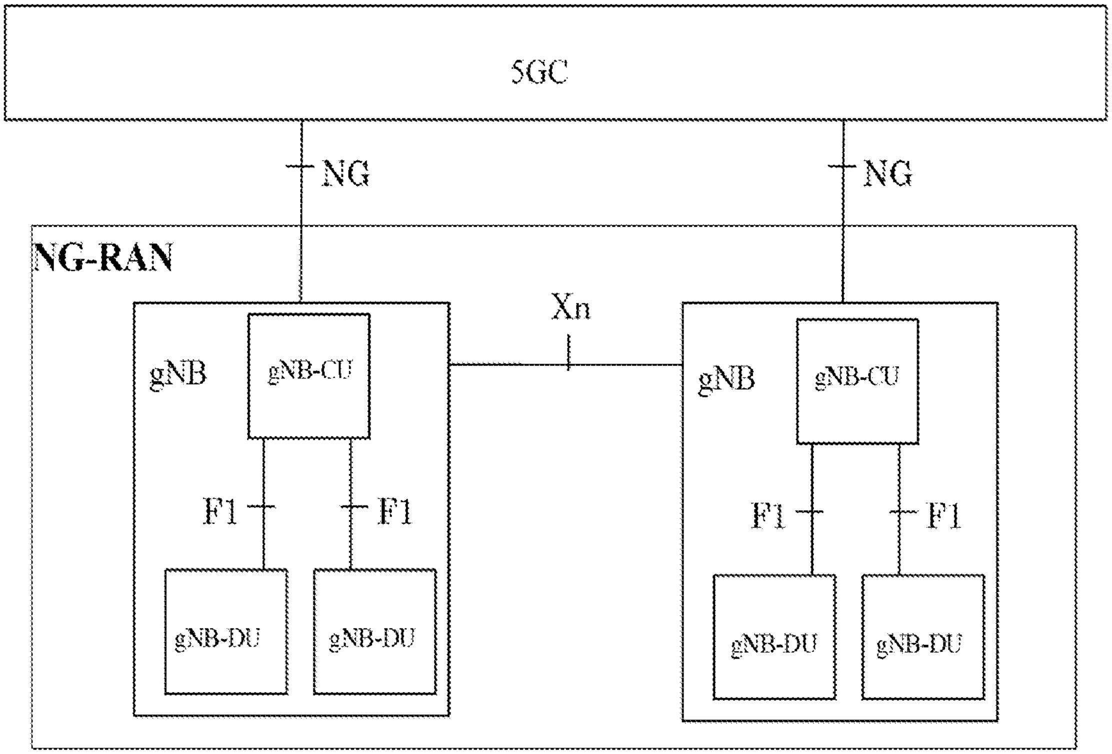
FIG. 1 is a schematic block diagram illustrating prior art.
Figure 2:
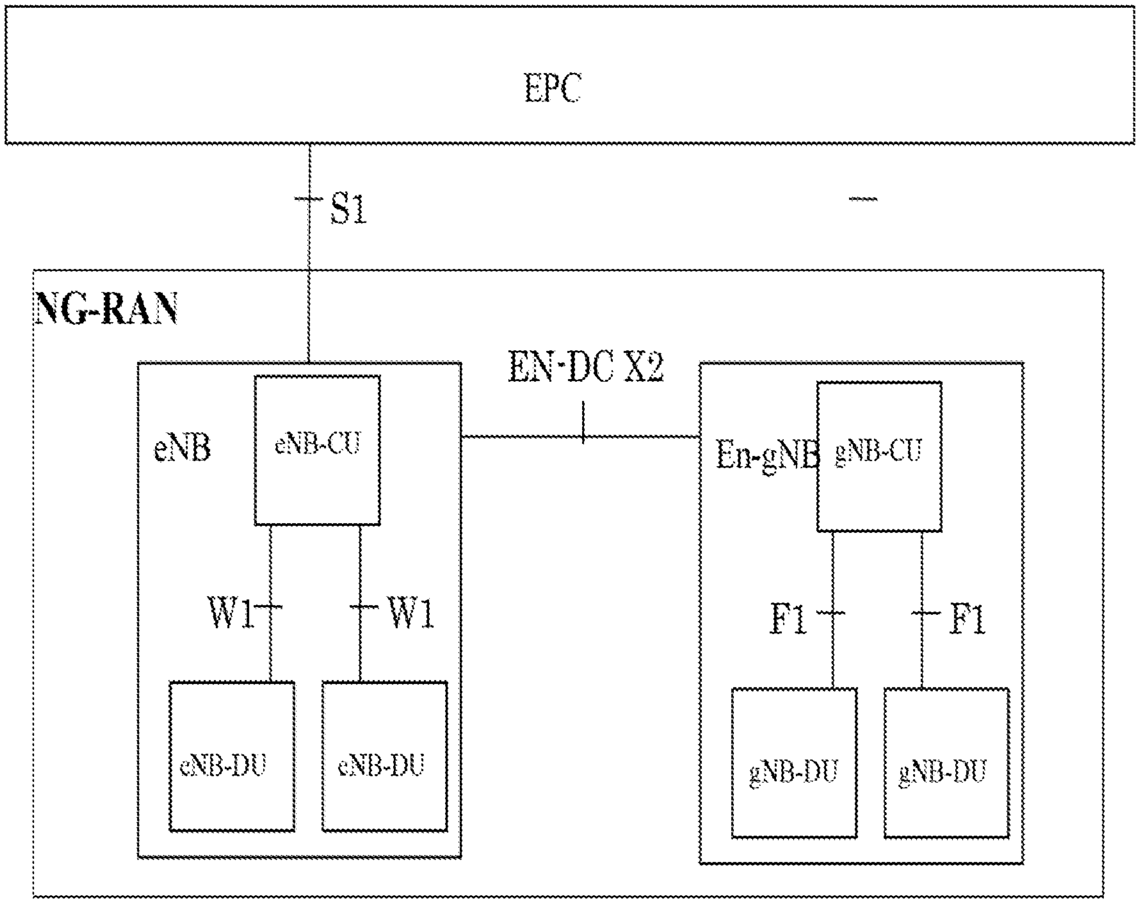
FIG. 2 is a schematic block diagram illustrating prior art.
Figure 3:
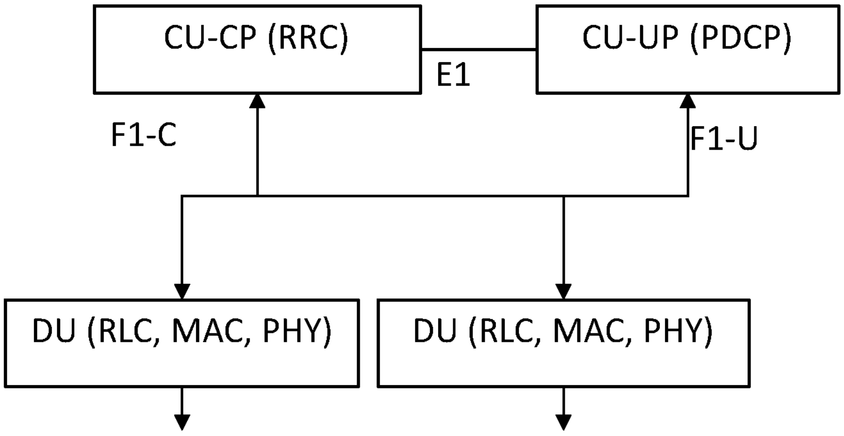
FIG. 3 is a schematic block diagram illustrating prior art.
Figure 4:
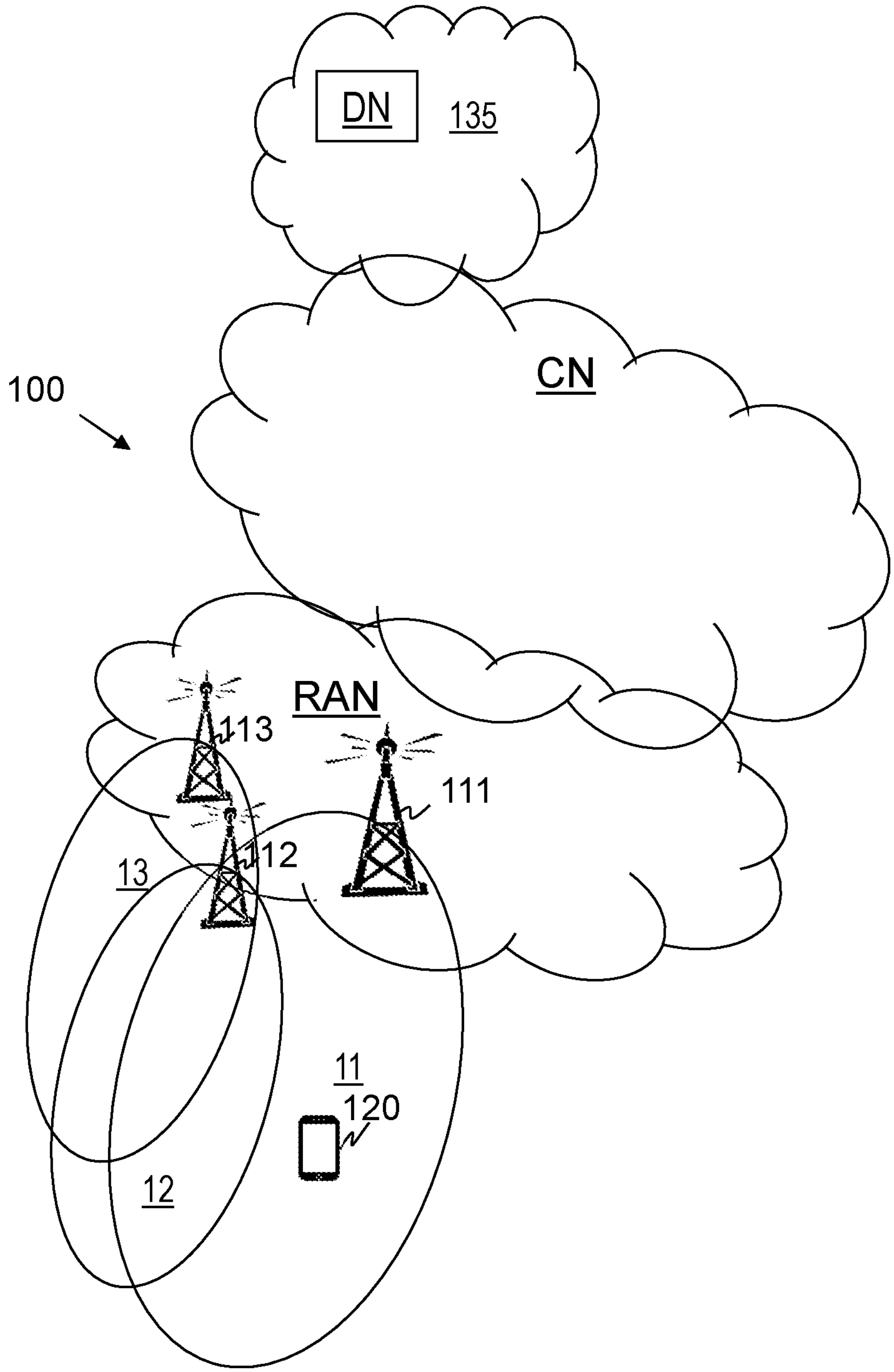
FIG. 4 is a schematic block diagram illustrating embodiments of a wireless communications network.

FIG. 4 is a schematic overview depicting a wireless communications network 100 wherein embodiments herein may be implemented. The wireless communications network 100 comprises one or more RANs and one or more CNs. The wireless communications network 100 may use a number of different technologies, such as Wi-Fi, Long Term Evolution (LTE), LTE-Advanced, 5G, NR, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

A number of network nodes operate in the wireless communications network 100 such as e.g., a first network node 111, second network node 112, and a third network node 113. The first, second and third network node 111, 112, 113 each provide radio coverage in a cell which may also be referred to as a beam or a beam group of beams, such as a cell 11 provided by the first network node 111, a cell 12 provided by the second network node 112, and a cell 13 provided by the third network node 113.

The first, second and third network node 111, 112, 113 may each be any of a NG-RAN node, a transmission and reception point e.g. a base station, a radio access network node such as a Wireless Local Area Network (WLAN) access point or an Access Point Station (AP STA), an access controller, a base station, e.g. a radio base station such as a NodeB, an evolved Node B (eNB, eNode B), a gNB, an NG-RAN node, a base transceiver station, a radio remote unit, an Access Point Base Station, a base station router, a transmission arrangement of a radio base station, a stand-alone access point or any other network unit capable of communicating with UEs 121, 122 within the service area served by the network node 110 depending e.g. on the first radio access technology and terminology used. The first, second and third network node 111, 112, 113 may communicate with UEs such as a UE 120, in DL transmissions to the UEs and UL transmissions from the UEs.

A number of UEs operate in the wireless communication network 100, such as e.g. the UE 120. The UE 120 may also referred to as a device, an IoT device, a mobile station, a non-access point (non-AP) STA, a STA, a user equipment and/or a wireless terminals, communicate via one or more Access Networks (AN), e.g. RAN, to one or more core networks (CN). It should be understood by the skilled in the art that "wireless device" is a non-limiting term which means any terminal, wireless communication terminal, user equipment, Machine Type Communication (MTC) device, Device to Device (D2D) terminal, or node e.g., smart phone, laptop, mobile phone, sensor, relay, mobile tablets or even a small base station communicating within a cell.

Methods herein may be performed by the first network node 111. As an alternative, a Distributed Node (DN) and functionality, e.g. comprised in a cloud 135 as shown in FIG. 4 and in FIG. 5, may be used for performing or partly performing the methods herein.

Figure 5:
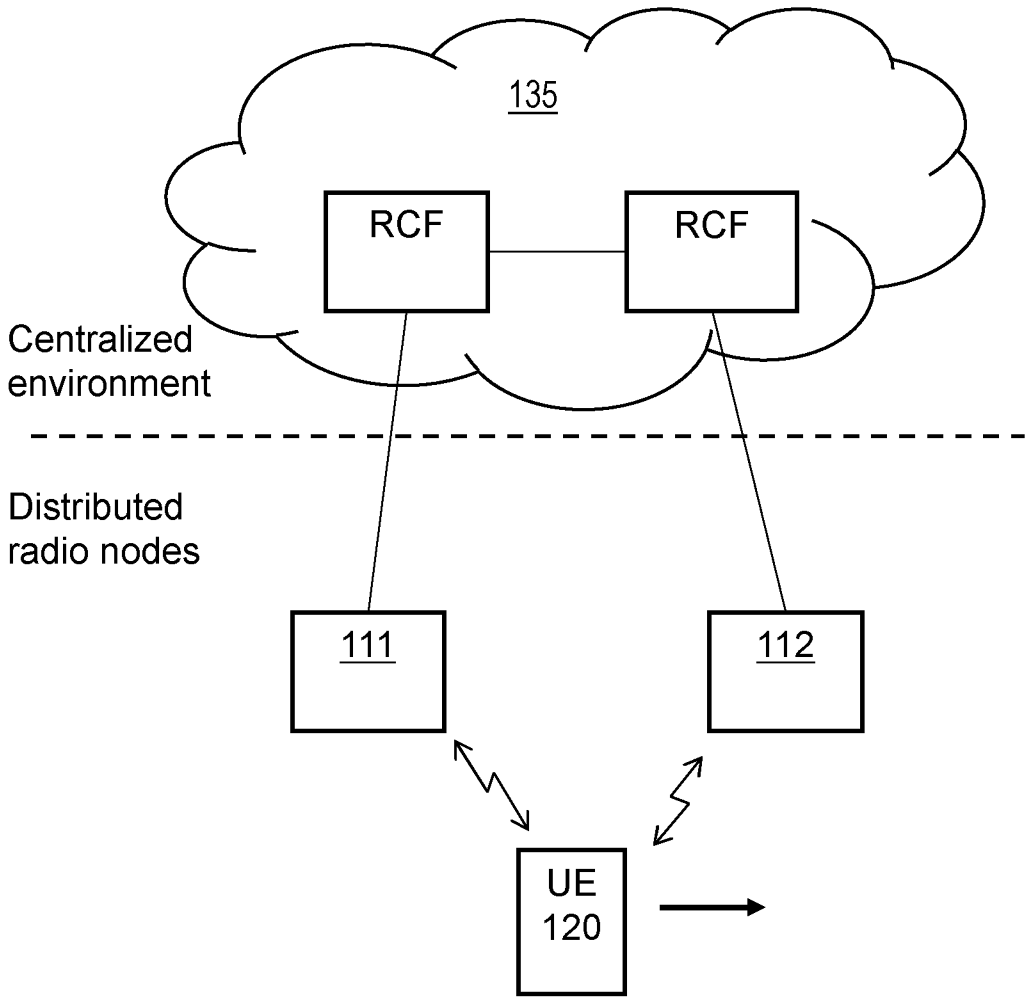
FIG. 5 is a schematic block diagram illustrating an example of embodiments herein.

FIG. 5. Depicts Radio control functions in a centralized computing environment e.g., in the cloud 135. The RAN part of embodiments may be in an NG-RAN, typically located in a Radio Control Function (RCF) in the first network node 111, the second network node 112 or third network node 113 (not shown in FIG. 5) e.g., being gNBs or ng-eNBs. The RCF may be located physically in a distributed entity close to the radio nodes (RN) such as the first network node 111, the second network node 112 or third network node 113, or in a data center in a central location or on suitable hardware somewhere in between, e.g., in the cloud 135.

A number of embodiments will now be described, some of which may be seen as alternatives, while some may be used in combination.

Figure 6:
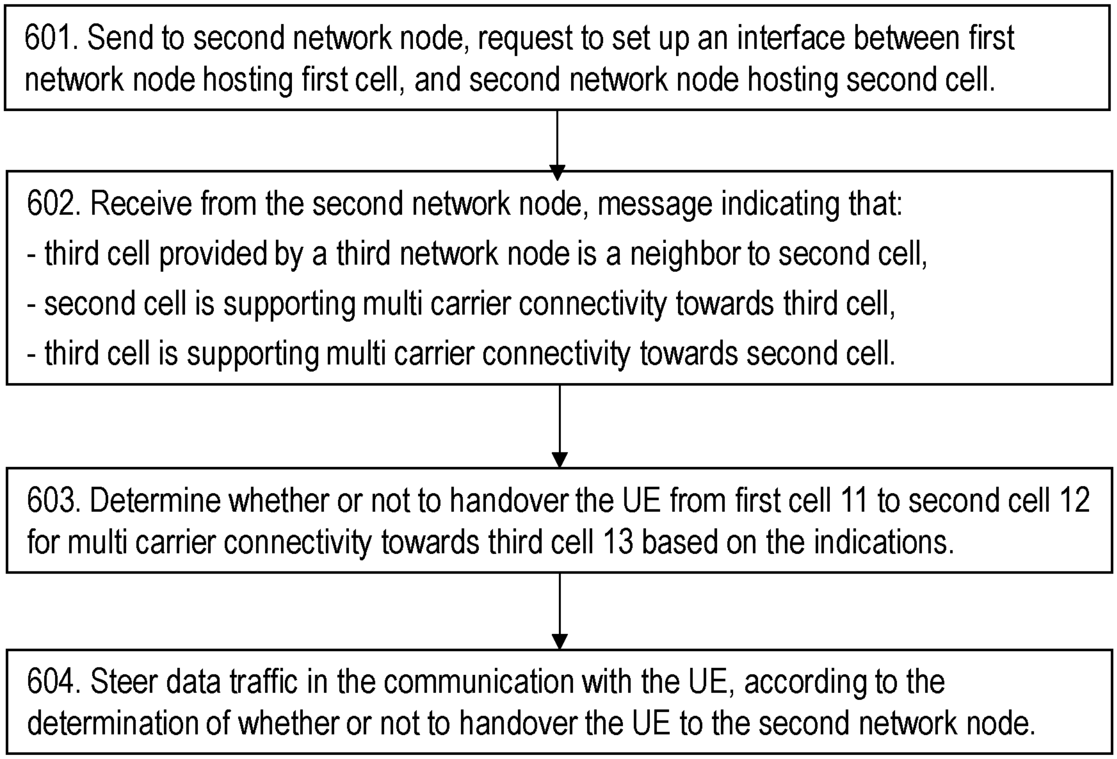
FIG. 6 is a flowchart depicting an embodiment of a method in a network node.

FIG. 6 shows example embodiments of a method performed by the first network node 111 for steering data traffic in a communication with the UE 120 in the wireless communications network 100.

The method comprises the following actions, which actions may be taken in any suitable order. Optional actions are referred to as dashed boxes in FIG. 6.

According to an example scenario, the first network node is about to start a communication with the UE 120. The first network node 111 requires to retrieve basis for steering data traffic in an advantageous way in this communication.

Action 601

The first network node 111 sends a request to the second network node 112. The request requests to set up an interface between the first network node 111 hosting a first cell 11 and a second network node 112 hosting a second cell 12. The second cell 12 is a neighbour to the first cell 11. In some embodiments the interface between the first cell 11 and the second cell 12 comprises an Xn interface.

The purpose of the Xn Setup procedure is to exchange application level configuration data needed for two NG-RAN nodes such as the first and second network nodes 111, 112, to interoperate correctly over the Xn-C interface, for example to enable a handover between two cells residing on different NG-RAN nodes.

The request may be sent in a message such as a XN SETUP REQUEST, XN SETUP RESPONSE or NG-RAN NODE CONFIGURATION UPDATE. The neighbour node such as the second network node 112 then sends a XN Setup Response. After both these messages has been exchanged the interface can be considered to be established. Information about node configuration can be sent in both setup request and setup response, but also in the NG-RAN Node Configuration update, but that message is not part of the interface setup procedure.

Action 602

The first network node 111 receives a message from the second network node 112 over the requested set up interface. The message comprises indications indicating that:

- a third cell 13 provided by a third network node 113 is a neighbour to the second cell 12,
- the second cell 12 is supporting multi carrier connectivity towards the third cell 13,
- the third cell 13 is supporting multi carrier connectivity towards the second cell 12, The message may e.g. be an XN SETUP REQUEST, XN SETUP RESPONSE or NG-RAN NODE CONFIGURATION UPDATE ACKNOWLEDGE or NG-RAN NODE Configuration update.

Action 603

The first network node 111 determines whether or not to handover the UE 120 from the first cell 11 to the second cell 12 for multi carrier connectivity towards the third cell 13 based on the indications in the received message.

In some embodiments the determining whether or not to handover the UE 120 to the second cell 12 for multi carrier connectivity towards the third cell 13 is further based on the available bandwidth in the respective first cell 11, second cell 12 and third cell 13. In some embodiments it may further be based on other properties of the cell.

In some embodiments the determining whether or not to handover the UE 120 further comprises determining a PCell for the UE 120 in the communication based on the indications in the received message.

The multi carrier connectivity may e.g. comprise anyone out of: Dual connectivity, or Carrier aggregation.

In some embodiments the determining whether or not to handover the UE 120 based on the indications in the received message, further comprises determining to handover the UE 120 to the second cell 12, and that the second cell 12 is to be a PCell for the UE 120, and that the third cell 13 is to be an SCell for the UE 120, in the communication.

Action 604

The first network node 111 then steers the data traffic in the communication with the UE 120, according to the determination of whether or not to handover the UE 120 to the second network node 112.

This is an advantage since it may be beneficial for the UE 120 to perform a handover towards the second cell 12 provided by the second network node 112, in those cases where it gives a better estimated throughput for the UE 120. This is since the third cell 13 is a neighbor to the second cell 12 and the second cell is supporting multi carrier connectivity towards the third cell 13.

The above embodiments will now be further explained and exemplified below. The embodiments below may be combined with any suitable embodiment above.

To enable the first network node 111 to also send the indication about different types of multi carrier connectivity support some of the embodiments herein provide to expand the Connectivity support IE from 3GPP TS 38.423 with more information. The suggestion is presented in the below Table, where the underlined text is the provided new content.

The Connectivity Support IE is used to indicate the connectivity such as the multi carrier connectivity supported by an NR cell such as e.g. the first, second or third cell 11, 12, 13.

| IE/Group Name | Presence | Range | IE type and reference |
|---|---|---|---|
| EN-DC Support | M | | ENUMERATED (Supported, Not supported, . . . ) |
| CA Support | M | | ENUMERATED (Supported, Not supported, . . . ) |
| NR-DC Support | M | | ENUMERATED (Supported, Not supported, . . . ) |

The Connectivity Support IE is part of the Neighbor Information NR IE that is exchanged between gNBs such as e.g. the first and second network node 111, 112 in messages such as XN SETUP REQUEST, XN SETUP RESPONSE, NG-RAN NODE CONFIGURATION UPDATE and NG-RAN NODE CONFIGURATION UPDATE ACKNOWLEDGE.

In the message NG-RAN NODE CONFIGURATION UPDATE the Neighbor Information NR IE is sent in the served cells to update NR IE.

This means that according to embodiments herein a network node such as the second network node 112, during setup phase and during configuration update phase, may inform another network node such as the first network node 111 about the multi carrier connectivity support towards the third cell 13.

The benefit of the provided expansion and introduction of Connectivity Support is shown in the following example.

Figure 7:
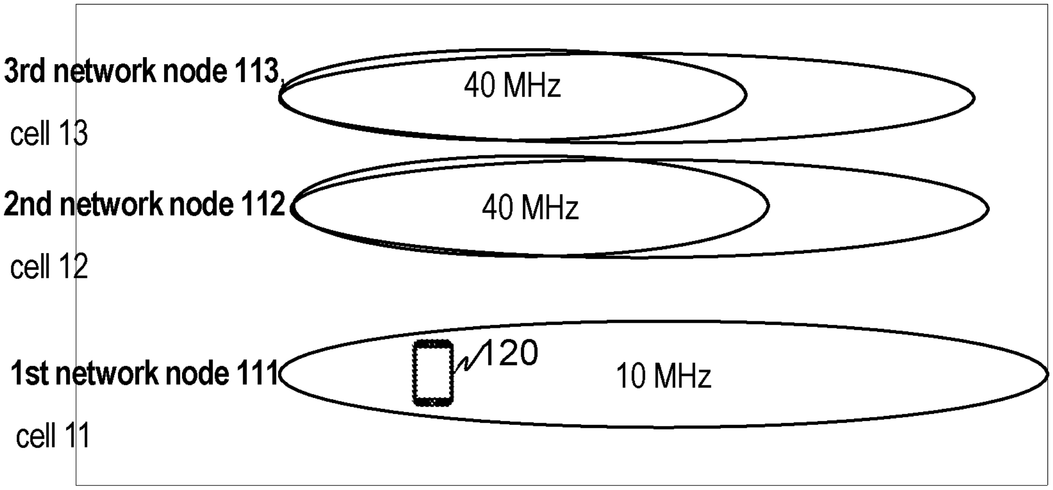
FIG. 7 is a schematic block diagram illustrating an example of embodiments herein.

In FIG. 7 an example deployment is shown. According to an example scenario, the UE 120 is connected to the first cell 11 providing 10 MHz in the first network node 111. In the example there is also two other network node e.g. gNBs, the second network node 112 and the third network node 113 that have cells 12, 13 providing respective 40 MHz, with overlap to the first cell 11.

When the first network node 111 starts doing evaluations for the UE 120 it may use a Connectivity Support/NR NR-DC parameter that it received from the second network node 112 and the third network node 113 during Xn setup phase or configuration update.

When Xn between the first network node 111 and the second network node 112 is established the second network node 112 informs the first network node 111 that the second cell 12 has a neighbor cell, the third cell 13, and that the second cell 12 and the third cell 13 have connectivity support for multi carrier connectivity.

The first network node 111 may then utilize the indication that the second network node 112 has a cell providing 40 MHz, the second 12, and one neighbor cell providing 40 MHz, the third cell 13, that it can do aggregation towards. In this particular example it may be beneficial for the UE 120 to perform a HO towards the second cell 12 in order to get a better, e.g., maximized, bandwidth for the UE 120. This may mean that the UE 120 would use the second cell 12 as PCell and the third cell 13 as an SCell in this example, providing 40 MHZ+40 MHz. Instead of as before the handover having the first cell 11 as a PCell providing 10 MHZ and the second cell 12 providing 40 MHZ as an SCell. In this case the bandwidth and/or the DL throughput is maximized As mentioned above, the second cell 12 is supporting multi carrier connectivity towards the third cell 13. In some embodiments, the indication may comprise both a direction of property and what is supported. This means that the indication may be used to inform that the multi carrier connectivity is supported from second cell 12 towards third cell 13, from third cell 13 towards second cell 12 or in both directions.

To perform the method actions above, the first network node 111 is configured to steer data traffic in a communication with the UE 120 in the wireless communications network 100. The network node 110 may comprise an arrangement depicted in FIGS. 8*a* and 8*b*.

The first network node 111 may comprise an input and output interface 800 configured to communicate with UEs such as the UE 120 and other network nodes such as the second and third network node 112, 113. The input and output interface 800 may comprise a wireless receiver (not shown) and a wireless transmitter (not shown).

The first network node 111 may further be configured to, e.g. by means of a sending unit 810 in the first network node 111, send a request to a second network node 112. The request is adapted to request to set up an interface between the first network node 111 hosting a first cell 11 and a second network node 112 hosting a second cell 12, which second cell 12 is adapted to be a neighbour to the first cell 11.

The interface between the first cell 11 and the second cell 12 may be adapted to comprise an Xn interface.

The first network node 111 is further configured to, e.g. by means of a receiving unit 820 in the first network node 111, receive a message from the second network node 112 over the requested set up interface. The message is adapted to comprise indications indicating that:

a third cell 13 provided by a third network node 113 is a neighbour to the second cell 12, the second cell 12 is supporting multi carrier connectivity towards the third cell 13, and the third cell 13 is supporting multi carrier connectivity towards the second cell 12, The first network node 111 is further configured to, e.g. by means of a determining unit 830 in the first network node 111, determine whether or not to handover the UE 120 from the first cell 11 to the second cell 12 for multi carrier connectivity towards the third cell 13 based on the indications in the received message.

The multi carrier connectivity may be adapted to comprise anyone out of: Dual connectivity, or carrier aggregation.

The first network node 111 is further configured to, e.g. by means of a determining unit 830 in the first network node 111, determine a Primary Cell, PCell, for the UE 120 in the communication based on the indications in the received message.

The first network node 111 may be further configured to, e.g. by means of the determining unit 830 in the first network node 111, determine whether or not to handover the UE 120 to the second cell 12 for multi carrier connectivity towards the third cell 13 by further basing it on the available bandwidth in the respective first cell 11, second cell 12 and third cell 13.

The first network node 111 may be further configured to, e.g. by means of the determining unit 830 in the first network node 111, determine whether or not to handover the UE 120 based on the indications in the received message, by determining to handover the UE 120 to the second cell 12 and that second cell 12 is to be a Primary Cell, PCell, for the UE 120, and that the third cell 13 is to be a Secondary Cell, SCell, for the UE 120, in the communication.

The first network node 111 is further configured to, e.g. by means of a steering unit 840, steer the data traffic in the communication with the UE 120 according to the determining of whether or not to handover the UE 120 to the second network node 112.

Figure 8A:
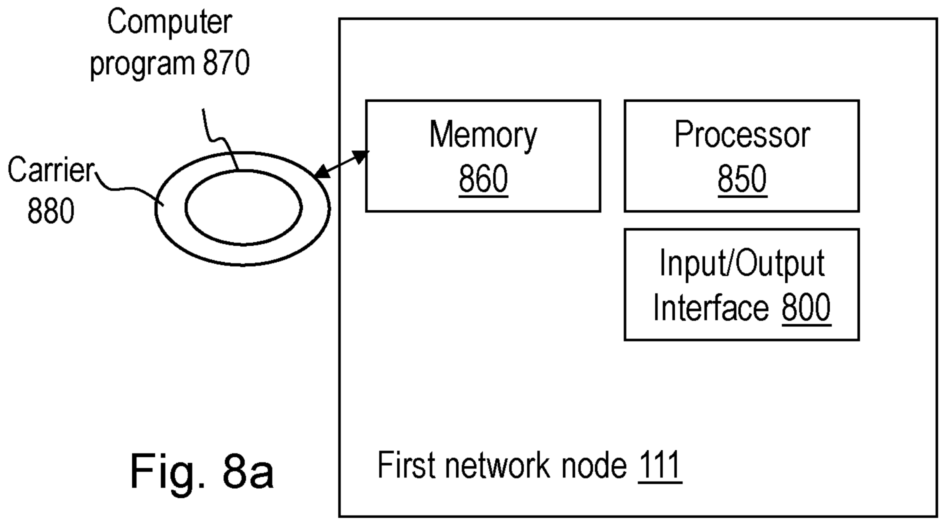
FIG. 8*a-b* are schematic block diagrams illustrating embodiments of a function node.
Figure 8B:
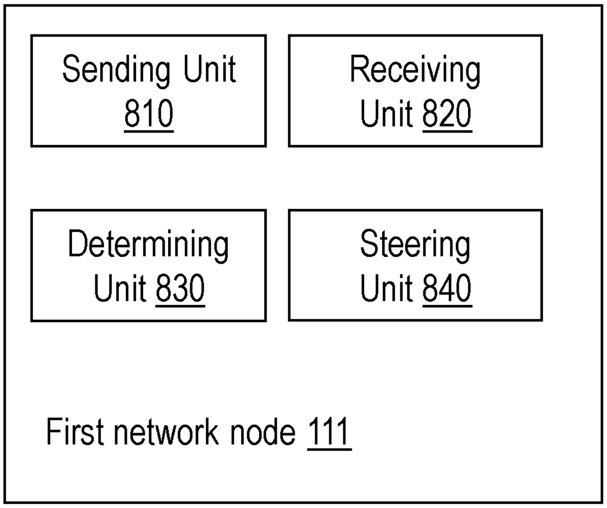

The embodiments herein may be implemented through a respective processor or one or more processors, such as the processor 850 of a processing circuitry in the first network node 111 depicted in FIG. 8*a*, together with respective computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the first network node 111.

The first network node 111 may further comprise a memory 860 comprising one or more memory units. The memory 860 comprises instructions executable by the processor in the first network node 111. The memory 860 is arranged to be used to store e.g. information, indications, data, configurations, and applications to perform the methods herein when being executed in the first network node 111.

In some embodiments, a computer program 870 comprises instructions, which when executed by the respective at least one processor 360, cause the at least one processor of the first network node 111 to perform the actions above.

In some embodiments, a respective carrier 880 comprises the respective computer program 870, wherein the carrier 880 is one of an electronic signal, an optical signal, an electromagnetic signal, a magnetic signal, an electric signal, a radio signal, a microwave signal, or a computer-readable storage medium.

Those skilled in the art will appreciate that the units in the first network node 111 described above may refer to a combination of analog and digital circuits, and/or one or more processors configured with software and/or firmware, e.g., stored in the first network node 111, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 9:
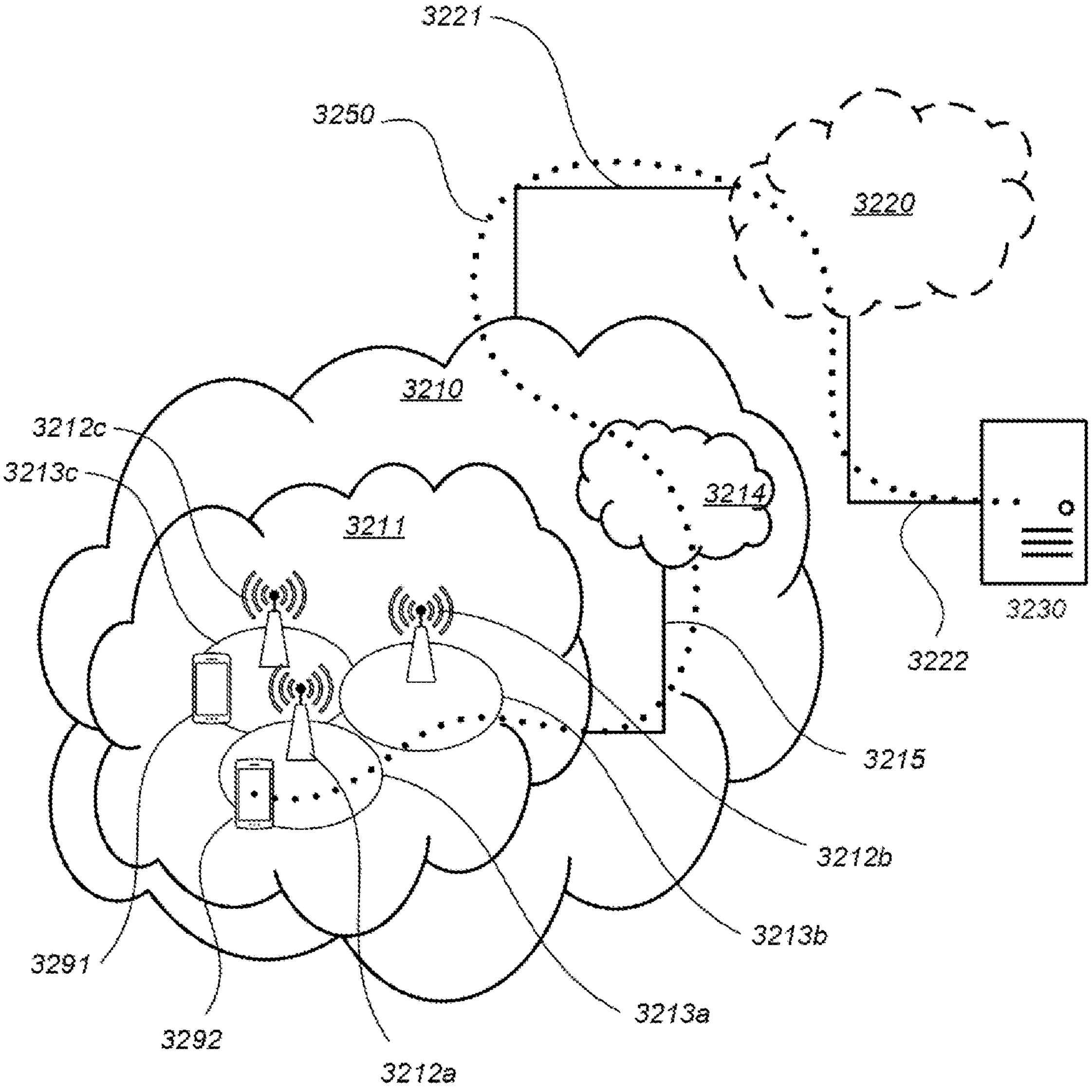
FIG. 9 schematically illustrates a telecommunication network connected via an intermediate network to a host computer.

With reference to FIG. 9, in accordance with an embodiment, a communication system includes a telecommunication network 3210, such as a 3GPP-type cellular network, e.g. the wireless communications network 100, which comprises an access network 3211, such as a radio access network, and a core network 3214. The access network 3211 comprises a plurality of base stations 3212*a*, 3212*b*, 3212*c*, e.g. the first network node 111, such as AP STAs NBs, eNBs, gNBs or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) such as a Non-AP STA 3291, e.g. the UE 120, located in coverage area 3213*c* is configured to wirelessly connect to, or be paged by, the corresponding base station 3212*c*. A second UE 3292 e.g. the UE 122, such as a Non-AP STA in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 9 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 10. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 10) served by the base station 3320. The communication interface 3326 may be configured to facilitate a connection 3360 to the host computer 3310. The connection 3360 may be direct or it may pass through a core network (not shown in FIG. 10) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 10 may be identical to the host computer 3230, one of the base stations 3212*a*, 3212*b*, 3212*c* and one of the UEs 3291, 3292 of FIG. 9, respectively. This is to say, the inner workings of these entities may be as shown in FIG. 10 and independently, the surrounding network topology may be that of FIG. 9.

Figure 10:
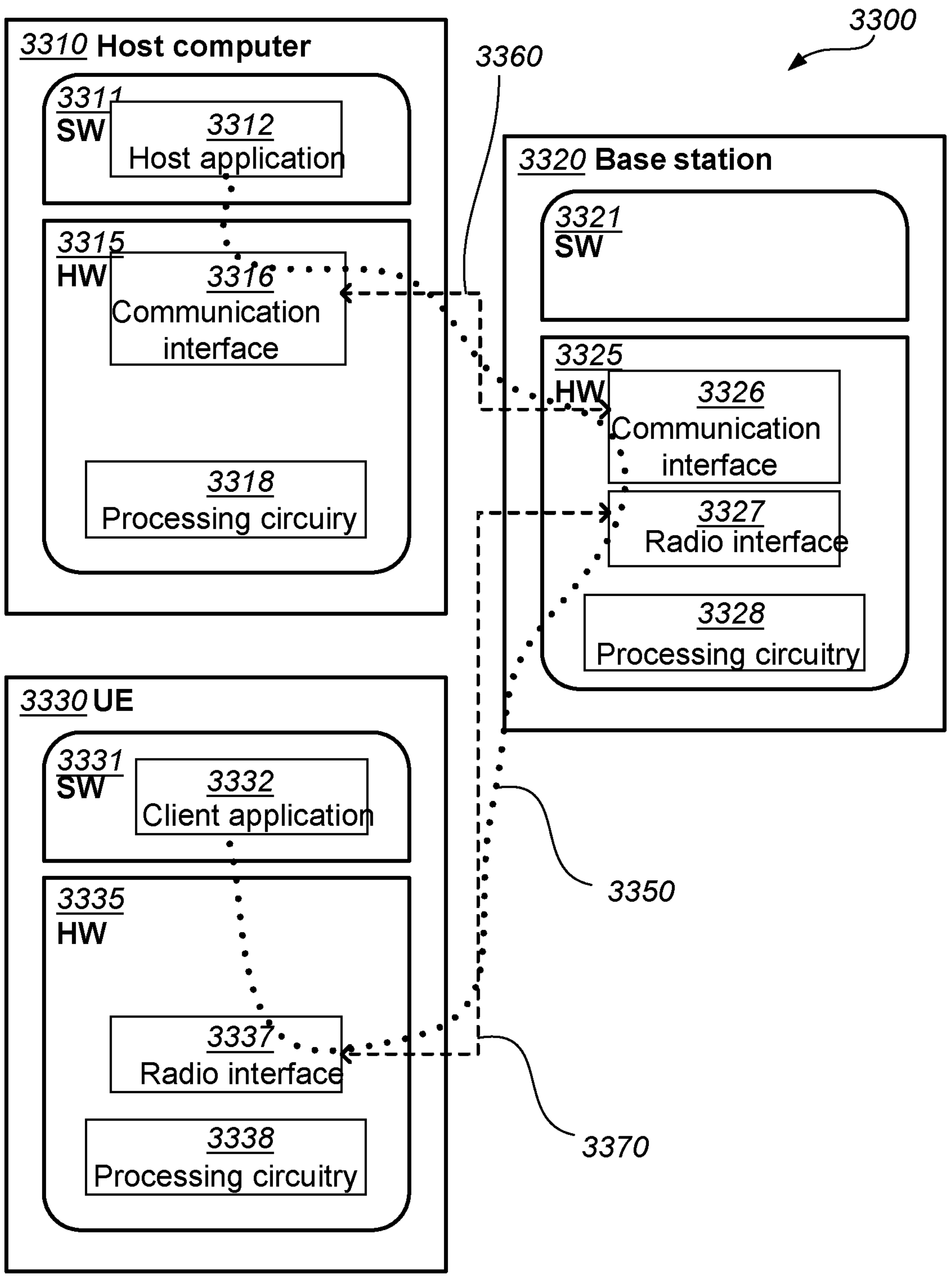
FIG. 10 is a generalized block diagram of a host computer communicating via a base station with a user equipment over a partially wireless connection.

In FIG. 10, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the RAN effect: data rate, latency, power consumption and thereby provide benefits such as corresponding effect on the OTT service: reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 11:
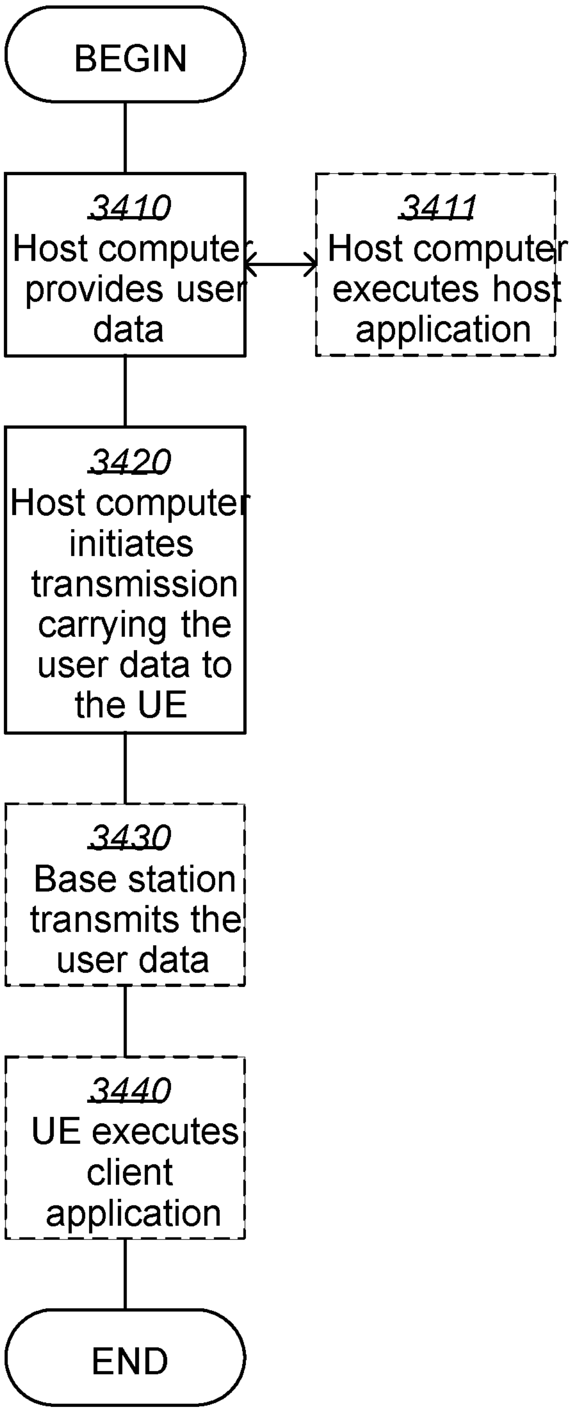

FIG. 11 is a flowchart illustrating a method implemented in a communication system, in accordance with one embodiment. The communication system includes a host computer, a base station such as a AP STA, and a UE such as a Non-AP STA which may be those described with reference to FIG. 10 and FIG. 9. For simplicity of the present disclosure, only drawing references to FIG. 11 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

Figure 12:
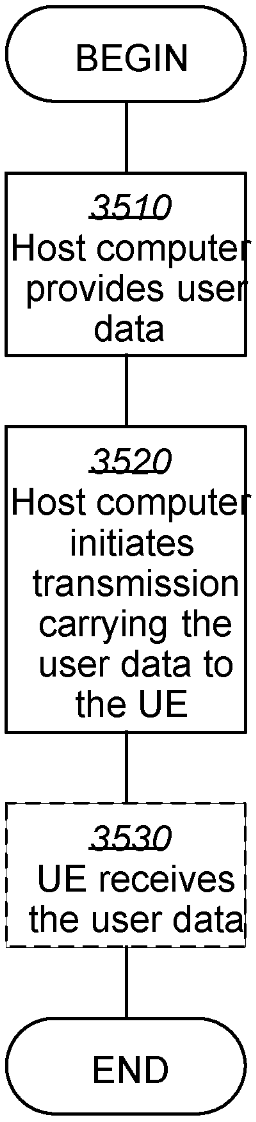

FIG. 12 is a flowchart illustrating a method implemented in a communication system, in accordance with one embodiment. The communication system includes a host computer, a base station such as a AP STA, and a UE such as a Non-AP STA which may be those described with reference to FIG. 9 and FIG. 10. For simplicity of the present disclosure, only drawing references to FIG. 12 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 13:
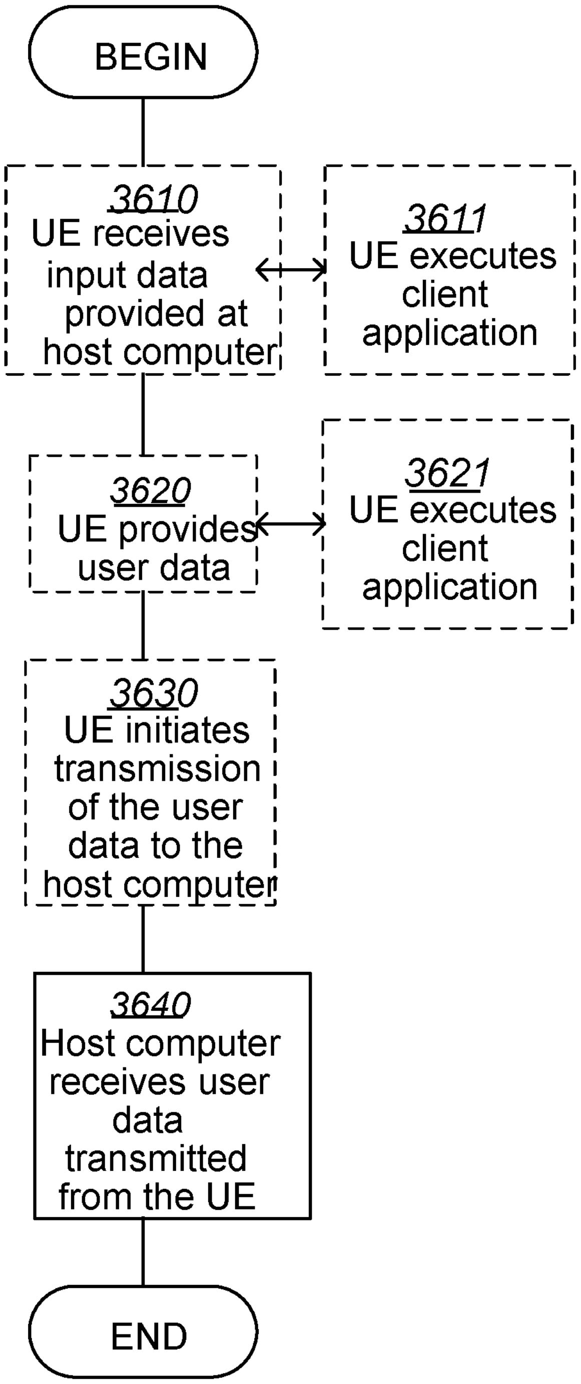

FIG. 13 is a flowchart illustrating a method implemented in a communication system, in accordance with one embodiment. The communication system includes a host computer, a base station such as an AP STA, and a UE such as a Non-AP STA which may be those described with reference to FIG. 9 and FIG. 10. For simplicity of the present disclosure, only drawing references to FIG. 13 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station such as a AP STA, and a UE such as a Non-AP STA which may be those described with reference to FIG. 9 and FIG. 10. For simplicity of the present disclosure, only drawing references to FIG. 14 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

ABBREVIATIONS

| Abbreviation | Explanation |
|---|---|
| HO | Handover |
| DC | Dual Connectivity |
| CA | Carrier Aggregation |
| PCell | Primary Cell |
| SCell | Secondary Cell |
| RCF | Radio Control Function |
| RN | Radio Network |
| UE | User Equipment |
| IE | Information Element |

The invention claimed is:

1. A method performed by a first network node for steering data traffic in a communication with a User Equipment in a wireless communications network, the method comprising:

sending a request to a second network node, which requests to set up an interface between the first network node hosting a first cell and the second network node which is hosting a second cell, and which second cell is a neighbour to the first cell, wherein the interface comprises an Xn interface, receiving a message from the second network node over the requested set up interface, which message comprises indications indicating that:

a third cell provided by a third network node is a neighbour to the second cell, the second cell is supporting multi carrier connectivity towards the third cell, the third cell is supporting multi carrier connectivity towards the second cell, determining whether or not to handover the UE from the first cell to the second cell for multi carrier connectivity towards the third cell based on the indications in the received message, and steering the data traffic in the communication with the UE according to the determining of whether or not to handover the UE to the second network node.

2. The method according to claim 1, wherein the determining whether or not to handover the UE to the second cell for multi carrier connectivity towards the third cell further is based on respective available bandwidths in the first cell, second cell and third cell.

3. The method according to claim 1, wherein the determining whether or not to handover the UE further comprises determining a Primary Cell for the UE in the communication based on the indications in the received message.

4. The method according to claim 1, wherein the multi carrier connectivity comprises anyone out of:

dual connectivity, or carrier aggregation.

5. The method according to claim 1, wherein the determining whether or not to handover the UE based on the indications in the received message, further comprises determining to handover the UE to the second cell and that second cell is to be a Primary Cell for the UE, and that the third cell is to be a Secondary Cell, SCell, for the UE, in the communication.

6. A non-transitory computer-readable storage medium comprising instructions which, when executed by a computer, causes the computer to perform actions according to claim 1.

7. A first network node configured to steer data traffic in a communication with a User Equipment in a wireless communications network, the first network node further being configured to:

send a request to a second network node, which request is adapted to request to set up an interface between the first network node hosting a first cell and the second network node hosting a second cell, which second cell is adapted to be a neighbour to the first cell, wherein the interface comprises an Xn interface, receive a message from the second network node over the requested set up interface, which message is adapted to comprise indications indicating that:

a third cell provided by a third network node is a neighbour to the second cell, the second cell is supporting multi carrier connectivity towards the third cell, the third cell is supporting multi carrier connectivity towards the second cell, determine whether or not to handover the UE from the first cell to the second cell for multi carrier connectivity towards the third cell based on the indications in the received message, and steer the data traffic in the communication with the UE according to the determining of whether or not to handover the UE to the second network node.

8. The first network node according to claim 7, wherein the first network node further is configured to determine whether or not to handover the UE to the second cell for multi carrier connectivity towards the third cell by further basing it on respective available bandwidths in the first cell, second cell and third cell.

9. The first network node according to claim 7, wherein the first network node further is configured to determine a Primary Cell for the UE in the communication based on the indications in the received message.

10. The first network node according to claim 7, wherein the multi carrier connectivity is adapted to comprise anyone out of:

dual connectivity, or carrier aggregation.

11. The first network node according to claim 7, wherein the first network node further is configured to determine whether or not to handover the UE based on the indications in the received message, by determining to handover the UE to the second cell and that the second cell is to be a Primary Cell for the UE, and that the third cell is to be a Secondary Cell for the UE, in the communication.

* * * * *